June 19, 1962 W. KRIEWETH ET AL 3,040,166
MACHINE FOR AUTOMATIC UPWARD ELECTRIC
WELDING OF VERTICAL JOINTS
Filed Dec. 9, 1960 6 Sheets-Sheet 1

FIG.1

INVENTORS
Wolfgang Krieweth
Klaus Dohm
BY

June 19, 1962

W. KRIEWETH ET AL

3,040,166

MACHINE FOR AUTOMATIC UPWARD ELECTRIC
WELDING OF VERTICAL JOINTS

Filed Dec. 9, 1960

INVENTORS
Wolfgang Krieweth
Klaus Dohm
BY

United States Patent Office 3,040,166
Patented June 19, 1962

3,040,166
MACHINE FOR AUTOMATIC UPWARD ELECTRIC WELDING OF VERTICAL JOINTS
Wolfgang Krieweth and Klaus Dohm, Aachen, Germany, assignors to La Soudure Electrique Autogene, Procedes Arcos, Brussels, Belgium
Filed Dec. 9, 1960, Ser. No. 74,899
Claims priority, application Belgium May 30, 1960
15 Claims. (Cl. 219—126)

The present invention relates to a machine for automatic upward electric welding of vertical joints between metallic parts, using at least one fusible electrode fed continuously in the gap to fill with molten metal, through a wire-guide installed in front of a supporting slide moving automatically and alternately in a horizontal direction parallel to the abutting faces of the parts to be joined by weld metal, said slide being connected to a support carrying shoes intended to dam the weld pool located in the vertical gap between the abutting faces of the parts being welded, said support moving vertically along a stationary guide comprising two uprights.

A machine of this kind may be used with the electroslag arc welding process, or with the submerged arc welding process, or with gas-protected arc welding process.

Machines of the above character are known in which the reciprocally moving slide mentioned hereabove is located on the side of one only of two uprights used to guide the slide support vertically, the other upright being located on the side of the first upright opposite the side facing the slide. Furthermore, the vertically moving support is located behind both uprights, being understood that the front of the uprights is the direction where the wire-guide extends. In operation, both uprights are situated at the same distance from the parts being welded and their surfaces used to guide the vertically moving support are thus at equal distance from the parts being welded. As a result, when the parts being welded are themselves located against thick walls leaving between them only a poorly accessible narrow space, at the end of which the vertical welding gap between the parts being welded is located, then this narrow space is not wide enough to admit the reciprocally moving slide and both uprights spaced from one another in a direction perpendicular to that of the motion of the slide.

If the slide support were installed on a single upright, the supporting base of the latter would have to have sufficient size to ensure good stability for the whole device, so that it could not penetrate within the narrow space either. In both cases, welding would be possible only by lengthening the wire-guide and the shoebrackets extensively.

The present invention covers a machine freed from this drawback.

The machine as per the invention is characterized in having both uprights arranged relatively to each other so that the guiding surface of one of them is farther away from the parts being welded than the guiding surface of the other upright, and both uprights are installed on a base having a rectangular shape of narrow dimension in a direction perpendicular to the vertical plane where the reciprocal motion of the slide takes place, the lateral stability of said base being obtained by a transversal footing extension located at the base end farthest away from the wire-guide.

Preferably, the base and the transversal footing extension are shaped like a T with the uprights supporting the moving elements located on the central stem of the T.

In known machines, a speed reducer is installed between the slide support and an electric motor mounted on said support to obtain a slow lifting motion of the support. Bringing this support down after completion of an upward-welded joint must therefore be performed at the same speed as the rise during welding.

The machine as per the invention remedies this drawback with a normally-locked clutching device installed between the slide support which moves vertically and an electric motor used to obtain this motion, while clutch-releasing means permit to lower the slide support independently from this motor.

It is therefore possible to stop the rise by acting on this release and to lower the moving support at will. The downward motion can be braked by any convenient means to prevent a free fall of this support and of other elements connected to it.

In an advantageous form of execution, when the clutching device is of the friction type, a stop is provided on the trajectory of the clutch-releasing organ to release the clutch when hitting the stop, in order to limit automatically the upward motion of the slide support whenever the latter has reached a predetermined level.

By this means, not only is the end of the vertical motion obtained, but also a free fall of the support is prevented, since the upward motion tends to resume as soon as the release mechanism separates from the stop. There is thus a position of equilibrium for the friction clutch where friction between the mating surfaces is sufficient to prevent a drop of the moving support, but insufficient to give it further rise.

With the known machines, before starting the welding operation, the machine must be moved toward the parts to weld until one of the shoes makes convenient contact against the parts, then the spacing between the shoes must be adjusted according to the thickness of the parts at the location where they are to be welded. The precise handling of the machine is sometimes difficult and can be avoided in the case of the machine as per the invention, because the slide support carries directly one of the said shoes and is adjustable in the direction of motion of the slide with respect to a carriage guided vertically between the stationary uprights.

The machine according to the invention is also provided with a coupling between the slide and the actuation of its reciprocal motion, by which damage to said actuation can be avoided if some abnormal resistance to the motion of a welding head carried by the slide support toward the parts being welded should develop.

For this purpose, in the machine as per the invention, the said slide is moved horizontally in its reciprocal path, by means of a coupling which releases its action with respect to an actuating chain, whenever the resistance to the motion of the slide exceeds a value preset by the designer.

In known machines of this kind, the reciprocal motion of the slide carrying the wire-guide is obtained by the action of two movable reversing switches carried by the slide and connected to electric circuits comprising one or more time-relays operating the actuating motor current supply in order to obtain reversal of the rotation of said motor each time one or the other of both movable switches hits one or the other of two adjustable stops.

These reversing switches are delicate devices, subject to deterioration in the more or less corrosive, gassy or dusty atmosphere surrounding them during welding, in addition to being vulnerable to mechanical shocks and even to the normal friction to which they are subjected at each reversal of the motion of the slide. Malfunction risks in the reciprocal motion of the slide are therefore greater than when more sturdy devices are used. When stoppage occurs in such a position of the welding head where these reversing switches are out of reach, the welding operation must be interrupted and the machine must be separated from the parts being welded in order to clean or repair the contacting surfaces. But it is well known that resumption of the welding operation after extended interruptions of this kind requires the removal of the shoes, the cutting of a slant or incline in the frozen weld metal, the resetting of the shoes and the fusion of a new pool of slag at the bottom of the incline before new metal can be deposited. This resumption of upward welding of thick parts also often results in the appearance of voids or slag inclusions at the lower portion of the incline.

The present invention has for further object a reduction of the undesirable work interruptions occurring with the known machines.

The machine according to the invention is characterized by the end of each horizontal stroke of the reciprocally-moving slide being obtained in each direction by the displacement of a lever of a reversing switch in the feeding circuit of an electric motor acting upon a chain connected to said slide, said switch being mounted on said slide in such position that its lever hits two stops adjustable in position with respect to the slide support, and by a driving device inserted between the chain and the motor to create a dead run at the start of each reciprocal motion.

In the machine as per the invention, instead of a purely electrical delayed action relay, an electromechanical device of much greater reliability is used, since the moving reversing switch is part of the feeding circuit of the motor and the dwell period between two successive runs in opposite directions is obtained by a mechanical device with a dead run.

In a simple form of execution which also enables easy adjustment of the duration of inaction of the chain at every change of direction, the said dead run device comprises a disc rotatively connected to one of the sprockets actuating the chain. Furthermore, this disc and this sprocket are idling on a bearing carried by a driving shaft which carries a pin designed to meet, according to the direction of rotation, either a fixed stop on the disc, or another stop on the disc, adjustable angularly with respect to the disc and driving the disc when hit by the pin.

To further facilitate the exact setting of the wire-guide in the vertical gap between the parts being welded, it is also provided, according to this invention, to install the wire-guide upon a welding head which is rotatable around a horizontal axis perpendicular to the direction of reciprocal motion of the wire-guide, and/or around a vertical axis with respect to the welding head.

Finally, in the case where the machine as per the invention is used with a welding process in which the welding pool is protected against oxygen of the air by a shielding gas, the supply of said gas to the vertical gap between the abutting faces of the parts being welded is advantageously obtained through the upper wall of one of the shoes by a channel through the latter, in such manner that the emerging gas jet be directed substantially in a plane parallel to the pool surface.

Other particularities and details of the invention will appear in the explanation given for the drawings attached to this specification, showing schematically and as example only, one form of execution of the machine of the invention.

In all these figures, identical reference notations designate identical elements.

Figure 1:
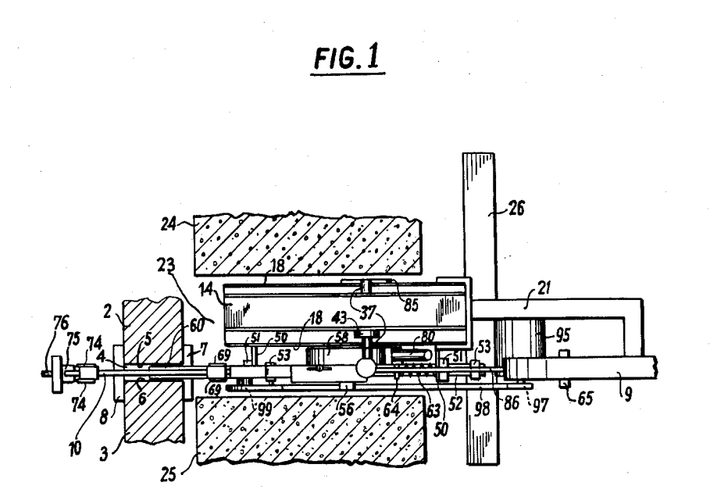
FIG. 1 shows schematically in plan view several elements of the machine as per the invention in the case where it is used with the electroslag process for automatic upward welding, of vertical joints between vertical plates.

The machine schematically shown in FIG. 1 is used for upward automatic welding of two thick plates 2 and 3 by means of a fusible metallic electrode fed continuously by means described later, in the gap 4 between the abutting faces 5 and 6 of plates 2 and 3. This gap must be filled with molten metal between shoes 7 and 8 pressed against the large faces of the plates where this molten metal is deposited, and in order to prevent this metal from running out.

Figures 2, 5:
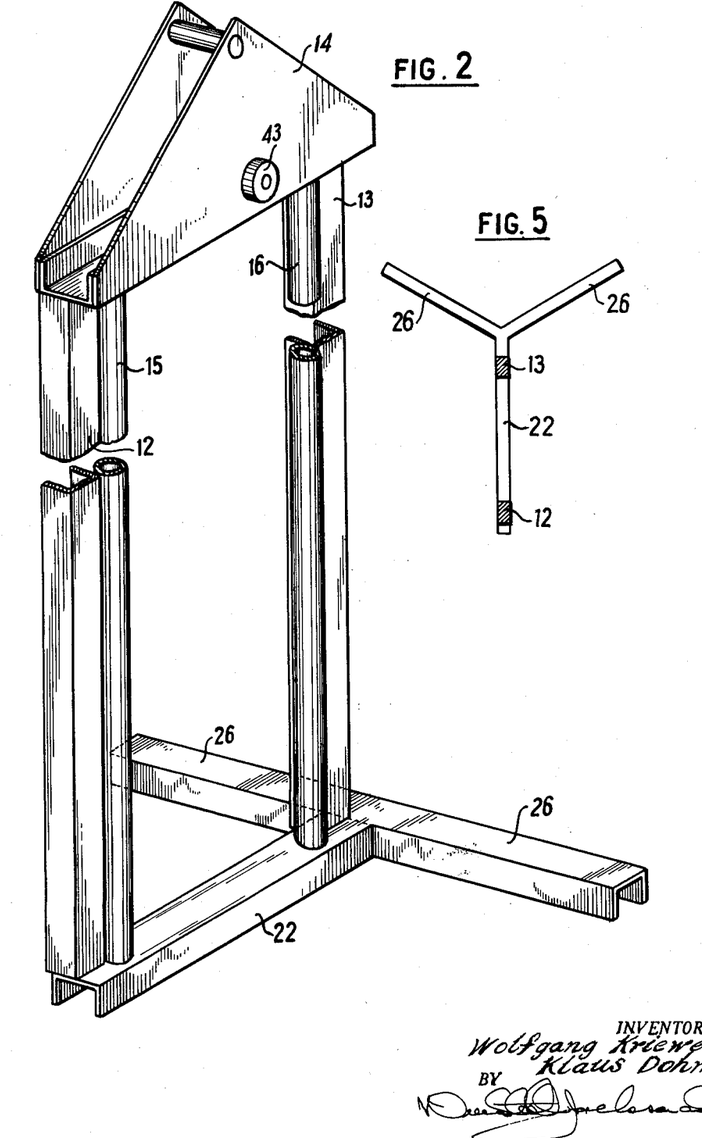
FIG. 2 shows in perspective view the vertical guide for a carriage holding the slide support having a horizontal reciprocal motion and shown in FIG. 1.
FIG. 5 is a plan view of a variation of the base which ensures the stability of these uprights.

The said fusible metallic electrode consists for instance of a steel wire unwinding from a reel 9 and guided downward into the gap 4 by a wire-guide. This guide is concealed in FIG. 1 by an arm 10 which carries the shoe 8. It is mounted in front of a slide which will be described later and which is given a horizontal reciprocating motion in the direction of double arrow X (FIGURE 3), parallel to the abutting faces 5 and 6 of the plates. This slide is mounted on a support 54 which carries the shoes 7 and 8 and whose distance to the parts being welded can be adjusted as explained later. This support is mounted on a carriage 11 which is movable vertically along a fixed guide made of two vertical uprights 12 and 13 joined at their upper ends by a beam 14 (FIGS. 1 and 2). Two tubes 15 and 16 (FIG. 2) are part of these uprights and act as a track for rollers 17 (FIG. 3) installed between braces 18 and 19 of carriage 11. These braces are joined by columns 20 and the carriage moves vertically along tubes 15 and 16 and uprights 12 and 13. At the top of brace 18 is an arm 21 carrying the reel 9.

The uprights 12 and 13 and the tubes 15 and 16 are arranged one in front of the other. Their guiding surfaces are therefore at substantially different distances from the plates 2 and 3 being welded. The cross-section of the uprights has an elongated rectangular shape having its smaller dimension perpendicular to the vertical plane in which the reciprocal motion of the slide takes place.

Both uprights 12 and 13 are connected to a base 22 (FIGS. 1 to 4) which shows in plan view like a narrow rectangle with the small dimension perpendicular to the plane of motion of the slide. This base can therefore be introduced easily, as well as the major portion of the machine, in a relatively narrow space such as 23 (FIG. 1) available in line with the vertical gap 4 between walls 24 and 25 located near the plates 2 and 3.

The lateral stability of the base 22 is obtained by a transversal footing 26 located at the end farthest away from the wire-guide. This footing and the base 22 together have the shape of a T, the central stem 22 of which carrying uprights 12 and 13. This base could obviously have another shape, for instance the one shown in FIG. 5, where the base 22 makes a 120 degree angle with each of the extensions 26 which give it stability.

The vertical motion of carriage 11 is actuated by an electric motor 27 arranged on said support between uprights 12 and 13. The axis of this motor is vertical in order to reduce the bulk of the machine in a direction perpendicular to the vertical plane of the slide motion, for possible introduction of the machine in a narrow space to reach the welding gap with the wire-guide.

The vertical motor 27 actuates the carriage 11 by means of two bevel gears 28 and 29. The latter is rotatively coupled with a spur pinion 30 meshing with a large gear 31, mounted idle on a shaft 32 axially movable. It actuates a conical ring 33 which is part of a friction clutch with a mating ring 34 resiliently pressed against ring 33. This second ring 34 is rotatively coupled to a sleeve 35 free over shaft 32 but controlled axially with respect to the latter. The shaft 32 is connected by a hinge 36 to a release lever 37 pivoted in 38 on a fixed housing 39 mounted on the upper part of carriage 11. This lever is subjected permanently to the action of spring 40 pressing the clutch rings 33 and 34 together. The sleeve 35 carries a sprocket 41 actuating a chain 42 passing over an idling sprocket 43 mounted on the upper beam 14 joining uprights 12 and 13 at the top of the machine. One end of this chain is attached in 44 to the upper portion of housing 39. The other end 45 of the chain is connected by a spring 46 to one of the braces 19 of carriage 11, in 47. Between the end attached to spring 46 and the sprocket 41, the chain 42 is deflected by idling sprockets 48 and 48', also by 49 on base 22.

The release lever 37 is bent to have a substantially horizontal extension above the housing 39. It can be seen easily that a downward pressure exerted on this horizontal portion of lever 37, depressing the spring 40, will move the shaft 32 and the sleeve 35 in such direction that the friction ring 34 of the clutch will tend to separate from ring 33 and the carriage 11 ceases climbing. If this separation between rings 33 and 34 is complete, the carriage 11 can fall freely and this drop must be braked to prevent damage. This can be done for example by acting directly on chain 42.

It should be noted that when the substantially horizontal portion of clutch-releasing lever 37 hits the stop of beam 14, the upward motion of carriage 11 ceases, without a fall of this support, because as soon as a drop begins the friction between rings 33 and 34 increases again sufficiently to resume climbing. It is clear that automatic stopping of the upward motion of carriage 11 could be obtained before lever 37 hits beam 14: another stop bar for this lever, at a lower level, would perform the same effect.

The lower braces 19 of carriage 11 carry two flanges 50 (FIGS. 3 and 4) provided with sleeves 51 for horizontal sliding of two rods 52 joined by braces 53 to create a frame 54. This frame acts as a support for the slide having a horizontal reciprocating motion, mentioned previously. The slide consists in two sleeves 55 moving on rods 52 and joined by a part 56 carrying a vertical pivot 57. The latter is attached to a part 58 later called "head-carrier."

A wire-guide 60 is attached to the welding head 59. It is curved downward to bring the continuous electrode wire in a convenient position to fuse into weld metal in the portion of the vertical gap 4 between shoes 7 and 8. The manner in which the slide 55—56 is moving reciprocally will be explained later.

At the ends of the rods 52 which support the slide 55—56, nearest to shoes 7 and 8, there is a rod 61 acting as pivot for a sleeve 62 carrying the shoe 7. By moving horizontally the frame 54 with respect to the carriage 11, this shoe can therefore be pressed exactly against the plates to weld, after approximate setting of the machine has been achieved. To complete the adjustment of the shoe 7 in good contact against the plates, the rods 52 are allowed to slide in the bushings 51 of carriage 11, under pressure of springs 63 around the rods 52 and compressed between one of the flanges 50 and collars 64 tight on the rods. The amplitude of the motion is adjusted by turning a small handwheel 65 locked on a threaded rod 66 screwing into one of the parts 53 of frame 54 and pressing against the adjacent flange 50.

One of the rods 52 of the frame carrying the slide has at the end near the shoe 7 a pin 67 engaging in a slot 68 of a piece 69 attached to the arm 10. The latter is attached to a sleeve 70 which can pivot around axis 71 carried by the carriage 11. The arm 10 carries the shoe 8 through a bar 72 hinged in 73 to a slide 74 movable on the arm 10. The distance between the shoes 7 and 8 is adjusted after locating the shoe 7 exactly against the parts to be welded, by rotating threaded knob 75 pressing against part 71 and engaging a threaded bar 76 connected to part 69.

The welding head 59 can rotate around a horizontal axis perpendicular to the direction of the reciprocal motion of the wire-guide 60. For this purpose, the welding head is mounted on the head-carrier 58 by a pivot 77 locked on a toothed sector 78. This one meshes with a worm 79 which can be rotated by a handle 80. The worm is prevented to move axially with respect to the head-carrier 58. By rotating the welding head 59 around pivot 77, the end 81 of the wire-guide 60 can be adjusted easily to a convenient level for the welding operation. In addition, the angular position of the guide-wire 60 can be adjusted with respect to the welding head 59 by a piece 82 having a circular slot and locking bolts 83.

The welding head shown comprises as usual a toothed roll 84 actuated by a motor 85 and used to feed the fusible wire 86 acting as electrode. The wire is pressed between the roll 84 and another roll 87 pressed against roll 84 by a spring 88 acting upon a pivoting roll-carrier lever 89.

Figures 6, 7, 8:
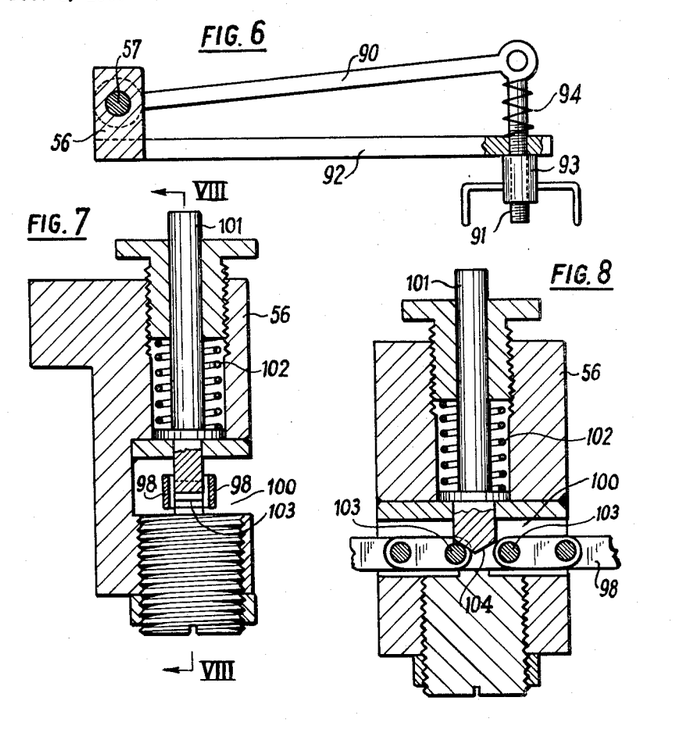
FIG. 6 is a plan view after making a horizontal section following lines VI—VI of FIGS. 3 and 4.
FIG. 7 shows, at a greater scale than FIG. 3, a vertical section by line VII—VII of FIG. 3.
FIG. 8 is a section by line VIII—VIII of FIG. 7.

On the vertical pivot 57 of the head-carrier 58 is locked a horizontal arm 90 (FIGS. 3, 4 and 6) hinged to a threaded bar 91 passing freely through a lug 92 of part 56 of the slide. A nut 93 is engaged on that bar and presses against one of the faces of the lug while the opposite face acts as a stop for a spring 94 pushing against the arm 90. By turning the nut 93, the head-carrier 58, the head 59 and the wire-guide 60 can be horizontally rotated to adjust the position of its end 81 in the width of the gap 4.

To obtain the horizontal reciprocal motion of the wire-guide 60 as per double arrow X, the machine comprises an electric motor 95 carried by an auxiliary platform 96 connected to the frame 54. This motor actuates a sprocket 97 and an endless chain 98 running over an idling sprocket 99 mounted on one of the parts 53. The reversal of the rotation of this chain is obtained by reversing the rotation of the motor as described later.

Part 56 of the slide 55—56 has a notch 100 (FIGS. 3, 7 and 8) in which chain 98 is passing. A pin 101 pressed resiliently by a spring 102 is engaged between two consecutive rollers of the chain in a link. The pin is slanted along two faces 104 pressing against the rollers 103 of the chain, in such manner that the pin 104 will not disengage the link of chain 98 unless a minimum resistance to the motion of the slide is encountered.

By this elastic coupling, the slide ceases to be actuated by the chain 98 if the resistance to the motion exceeds a predetermined setting. It could happen, for instance, that the wire 86 be prevented to move forward while the slide 55—56 moves closer to the parts being welded.

The end of the horizontal stroke of the slide 55—56 and of the wire-guide 60 in either direction is caused by the displacement of a lever 105 (FIG. 3) actuating a reversing switch mounted in a box 106 attached on part 56 of the slide 55—56. This lever can move between two limit stops 107 adjustable on a rod 108 carried by the parts 53 of frame 54.

Figure 9:
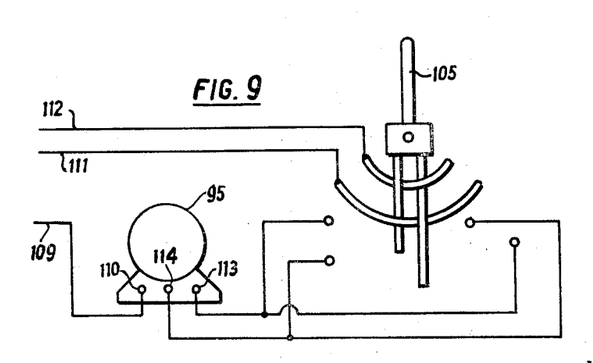
FIG. 9 is a diagram of current feeding for the motor actuating the reciprocally-moving slide.

The lever 105 of the reversing switch is part of the feeding circuit of motor 95. The latter is supplied, for instance, from a 3-phase source (FIG. 9) with one lead connected permanently to one of the terminals 110 of the motor while the two other leads 111 and 112 are connected alternately to two other terminals 113 and 114, depending upon the position occupied by lever 105 of the reversing switch.

Figure 10:
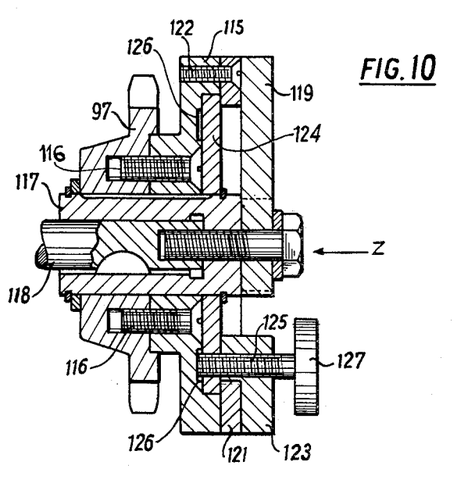
FIG. 10 is a section along broken line X—X of FIG. 2 in a driving device having a dead run.
Figure 11:
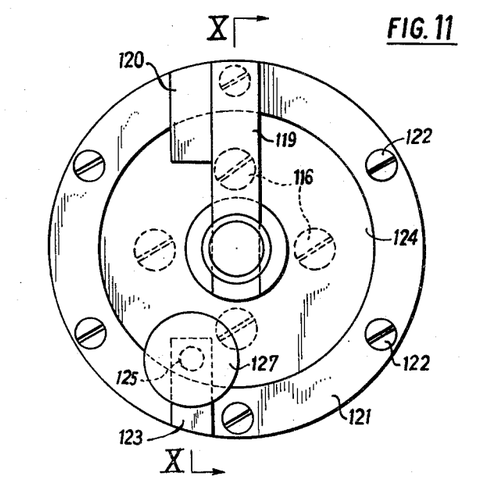
FIG. 11 is a view along arrow Z of FIG. 10.

The motor 95 driving the chain 98 actuates the latter through a device having a dead run at the beginning of each reciprocal motion. This device comprises a disc 115 connected to the sprocket 97 by screws such as 116. These two parts 97 and 115 idle by a bearing 117 on a shaft 118 which is the output shaft of a speed reducer actuated by motor 95. This shaft 118 rotates a pin 119 which will hit, either a stop 120 connected to a ring 121 attached to the disc 115 by screw 122 or a stop 123 adjustable angularly with respect to said disc. The stop 123 is carried by a washer 124 movable inside the disc 115 and covered partially by the ring 121. This washer is tightened to the disc 115 when pressed against the ring 121 by a screw 125 pressing against the bottom of a circular groove 126 in the disc, under action of the knob 127.

When the pin 119 hits one or the other of the two stops 120 and 123, it carries along the disc 115, the bearing 117 and the sprocket 97 driving the chain 98. Each time it quits one of these stops to move towards the other one, it ceases driving the sprocket 97 and the duration of inactivity of chain 98 at the end of each stroke depends upon the angular spacing between the stops 120 and 123. This angular spacing may be modified easily by unscrewing 125, rotating the washer 124 and the stop 123 and tightening the screw again upon the bottom of the circular groove 126.

Figure 3:
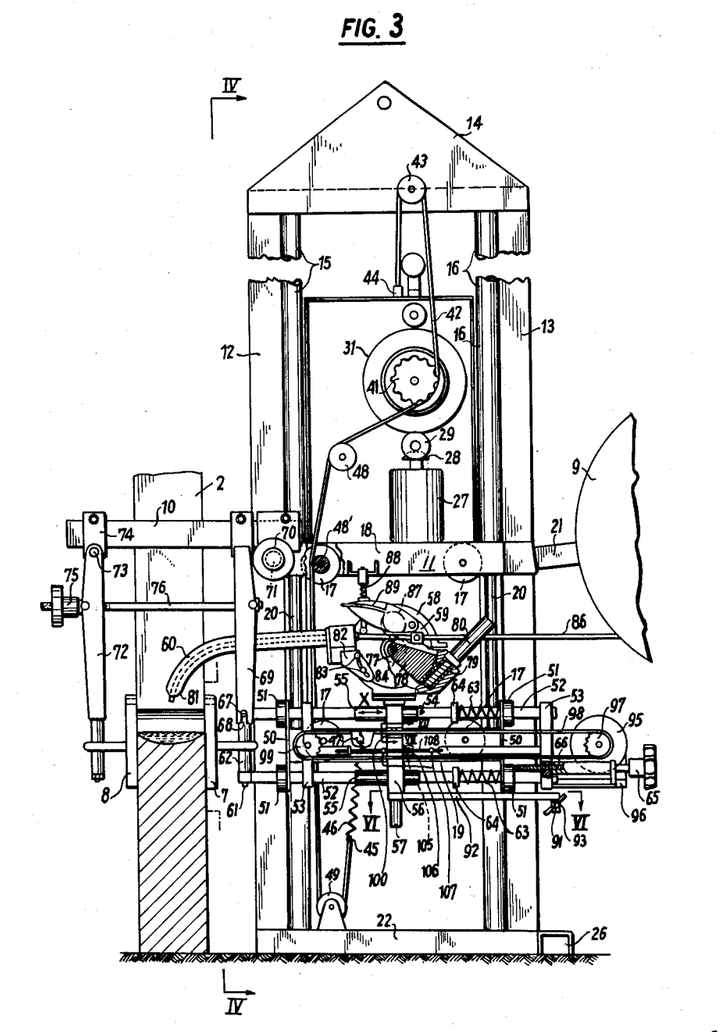
FIG. 3 is an elevation view of the main constituents of a machine after removing part of a cover concealing the mechanism used to move the carriage vertically.
Figure 4:
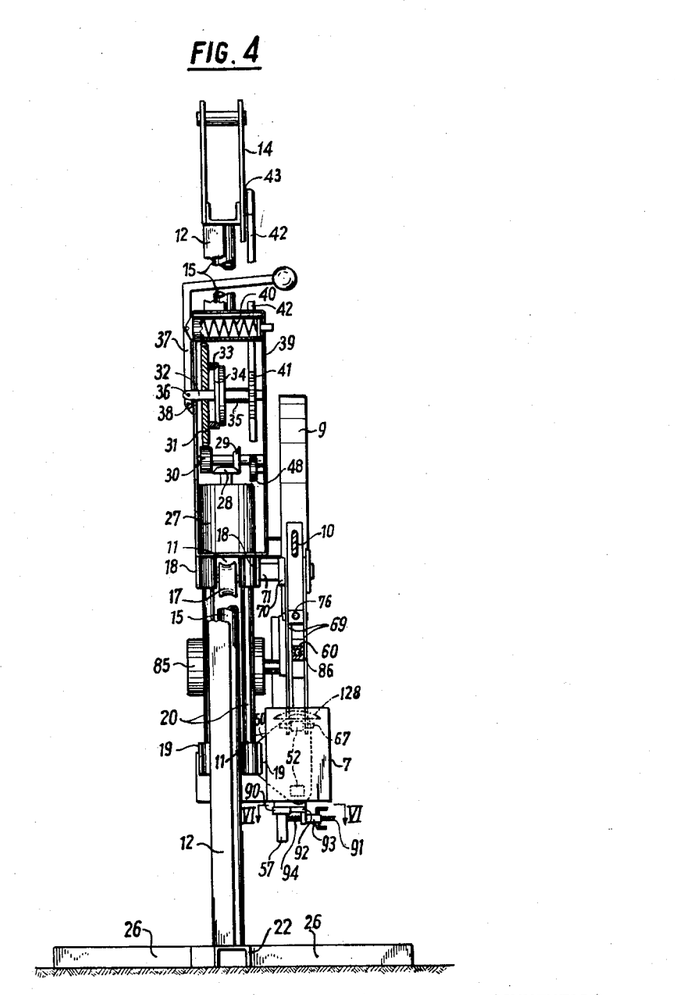
FIG. 4 is a view from front to back of the machine after sectioning along line IV—IV of FIG. 3 and removing another portion of the said cover, and after making a horizontal section across the lower portion of the uprights.

When the machine is used for automatic arc welding with a gas-shielding atmosphere, for instance a $CO_2$ atmosphere, the supply of this gas in the vertical gap 4 between the parts to be welded is obtained through the upper edge of one of the shoes 7 and 8 by a channel such as 128 shown in interrupted line in shoe 7 of FIGS. 3 and 4. This channel is directed in such way that the gas jet emerging from it be substantially parallel to the surface of the welding pool. Turbulence in the pool is thereby avoided. Preferably, the cross-section of this channel is elongated in the horizontal direction for a better distribution of the gas upon the entire surface of the pool. Several adjacent channels can be used for the same purpose. The output of shielding gas is advantageously fourteen liters per minute.

What we claim is:

1. A machine for automatically welding electrically vertical joints between thick vertical metallic plates from bottom to top, comprising two uprights having vertical axes arranged on one side only of plates to be welded at different distances from them, a base joining the said uprights and having a width of the same magnitude as the dimension of the uprights in a direction perpendicular to the vertical plane containing the said uprights, axes, a cross member extending said base at the end of the base farthest away from the plates being welded, a carriage installed between the uprights, means to move said carriage vertically between the uprights, an arm mounted on said carriage adapted to penetrate the gap already between the parts being welded, a first shoe on said arm adapted to be pressed against the face of the plates opposite the face nearest said carriage, a horizontal guide directed parallel to the vertical plane containing the upright axes on said carriage, a slide mounted on said horizontal guide in adjustable fashion at variable distance from the plates, means to actuate the slide automatically in a reciprocal horizontal motion on its horizontal guide, a second shoe carried by the guide, means of adjustment of the axial position of this guide with respect to the carriage usable to press the second shoe against the plates being welded, means to adjust the distance between the two shoes, a welding head installed on the slide, a wire guide carried by the welding head and guiding an electrode wire ahead of the slide into the vertical gap between the plates being welded, means on the welding head to feed automatically the electrode wire to the welding slide, and a coil of wire installed on said carriage.

2. A machine of claim 1, wherein the said base and the said cross member form a T shape, the center stem of which carries the uprights.

3. A machine of claim 1, wherein each of said uprights have a cross section of elongated shape with the small dimension perpendicular to the vertical plane containing the reciprocal motion of the said slide.

4. A machine of claim 1, wherein the said carriage carries an electric motor having a vertical axis driving a sprocket engaging a chain guided by idling pulleys installed respectively on a top cross member between said uprights and on the said base, said chain having its ends attached to the said carriage by means of a spring.

5. A machine of claim 4, in combination with a clutching device on said carriage between said electric motor and said sprocket, means permanently urging said clutching device towards its clutching position, and a clutch-releasing lever on said carriage permitting a declutching of said clutching device and consequently a free drop of said carriage during the time of the declutching.

6. A machine of claim 5, in combination with a clutching device of the friction type, a clutch-releasing lever, a stop on the trajectory of the clutch-releasing lever adapted to bring the said lever into a declutching position when the said lever encounters the stop, whereby the rise of said carriage is automatically limited when the said carriage reaches a predetermined level set by the position of said stop.

7. A machine of claim 6, wherein the said stop comprises a beam joining said uprights.

8. A machine of claim 1, wherein the adjusting means of the axial position of said horizontal guide comprises a threaded rod of adjustable position screwed in said guide, at least one spring permanently urging the latter towards the plates to be welded, and a stop on said carriage limiting the movement of said threaded rod towards the plates to be welded.

9. A machine of claim 1, wherein the said means to actuate the slide in a reciprocating horizontal movement comprises a reciprocating chain, and a yieldable coupling between said chain and said slide, said yieldable coupling being so constructed that it ceases to be actuated by said chain if the resistance to the motion of the slide exceeds a predetermined setting.

10. A machine of claim 9, wherein said yieldable coupling comprises a pin axially movable in the said slide, a spring pushing said pin between two consecutive rollers of said reciprocating chain, said pin having at its end two faces inclined with respect to its axis and contacting at least one of said rollers, the incline of said faces being determined in combination with the action of said spring upon the pin in such manner that said pin will slide upon one of said rollers and be displaced back against the action of the spring only for a predetermined resistance to the motion of the slide.

11. A machine of claim 9, in combination with a reversible electric motor which actuates the said reciprocating chain, a reversing switch of the feeding circuit of said motor mounted on said slide, a lever fixed to said reversing switch, two stops of adjustable position on said horizontal guide mounted so as to be encountered by the lever of said reversing switch and consequently to determine the end of each stroke of said slide, and a driving device interposed between said electric motor and said chain, said driving device having a dead run at the beginning of each driving stroke.

12. A machine of claim 11, wherein said dead run driving device comprises a driving shaft actuated by said electric motor, a disc idle on said driving shaft, a sprocket wheel connected to said disc, said sprocket wheel being in engagement with said reciprocating chain, a stop on said disc, another stop of adjustable angular position relatively to said disc, and a pin rotated by said driving shaft between said two stops.

13. A machine of claim 12, comprising a washer disposed in a cavity of said disc and carrying said stop of adjustable position, a ring fixed to said disc and extending in front of said washer, a threaded rod screwed in said washer and abutting against the bottom of said cavity for pushing said washer firmly against said ring.

14. A machine of claim 1, comprising a channel in the upper part of one of said shoes, and means leading a shielding gas under pressure to said channel, the latter being directed in such manner that the jet emerging from it be substantially parallel to the surface of the welding pool.

15. A machine of claim 14, wherein the cross section of said channel is elongated in a horizontal direction.

References Cited in the file of this patent

UNITED STATES PATENTS

| | | |
|---|---|---|
| 2,089,840 | Rockafeller | Aug. 10, 1937 |
| 2,927,992 | Bateman | Mar. 8, 1960 |
| 2,969,454 | Lucey | Jan. 24, 1961 |

FOREIGN PATENTS

| | | |
|---|---|---|
| 596,959 | Great Britain | Jan. 14, 1948 |
| 1,230,048 | France | Mar. 28, 1960 |